United States Patent
Kohlmeier-Beckmann et al.

(10) Patent No.: US 8,348,451 B2
(45) Date of Patent: Jan. 8, 2013

(54) INVISIBLE EMERGENCY ILLUMINATION FOR AN AIRCRAFT CABIN

(75) Inventors: Carsten Kohlmeier-Beckmann, Buxtehude (DE); Anja Niemeyer, Neu Wulmstorf (DE)

(73) Assignee: Airbus Operations GmbH, Hamburg (DE)

( * ) Notice: Subject to any disclaimer, the term of this patent is extended or adjusted under 35 U.S.C. 154(b) by 358 days.

(21) Appl. No.: 11/776,312

(22) Filed: Jul. 11, 2007

(65) Prior Publication Data

US 2008/0013332 A1 Jan. 17, 2008

(30) Foreign Application Priority Data

Jul. 12, 2006 (DE) .................. 10 2006 032 249

(51) Int. Cl.
*F21S 8/02* (2006.01)
(52) U.S. Cl. ........................ 362/147; 362/471
(58) Field of Classification Search .............. 362/147, 362/471, 479, 484, 148, 234, 364, 326, 470; 244/118.5
See application file for complete search history.

(56) References Cited

U.S. PATENT DOCUMENTS

| | | | | |
|---|---|---|---|---|
| 2,091,599 A * | 8/1937 | Larson et al. | | 224/29.5 |
| 2,284,356 A * | 5/1942 | Arenberg | | 224/29.5 |
| 4,903,175 A * | 2/1990 | Cotton | | 362/471 |
| 5,129,597 A | 7/1992 | Manthey et al. | | |
| 5,647,658 A * | 7/1997 | Ziadi | | 362/471 |
| 5,739,639 A | 4/1998 | Johnson | | |
| 6,092,915 A * | 7/2000 | Rensch | | 362/471 |
| 6,095,662 A | 8/2000 | Burroughs | | |
| 6,203,180 B1 * | 3/2001 | Fleischmann | | 362/471 |
| 6,871,981 B2 | 3/2005 | Alexanderson et al. | | |
| 7,645,052 B2 * | 1/2010 | Villard | | 362/147 |
| 7,896,530 B2 * | 3/2011 | Budinger et al. | | 362/471 |
| 2001/0023908 A1 | 9/2001 | Romca | | |
| 2005/0018439 A1 * | 1/2005 | Schevardo et al. | | 362/471 |
| 2005/0141226 A1 | 6/2005 | Wisch et al. | | |
| 2005/0211841 A1 | 9/2005 | Guard et al. | | |
| 2008/0012728 A1 | 1/2008 | Heym | | |

FOREIGN PATENT DOCUMENTS

| | | |
|---|---|---|
| DE | G8220984.7 | 10/1982 |
| DE | 3904375 A1 | 8/1990 |
| DE | 29809772 | 10/1998 |
| DE | 10318843 A1 | 11/2004 |
| EP | 0261811 | 3/1988 |
| WO | WO2005094378 | 10/2005 |
| WO | WO2005116519 | 12/2005 |
| WO | WO2006042050 | 4/2006 |

OTHER PUBLICATIONS

English translation of the abstract of DE 103 18 843 A1.

* cited by examiner

*Primary Examiner* — Sharon Payne
(74) *Attorney, Agent, or Firm* — Wood, Herron & Evans, LLP

(57) ABSTRACT

Emergency cabin illumination for an aircraft, including: at least one cabin component of an aircraft and at least one emergency lighting device, the at least one emergency lighting device being arranged in the cabin component so that the emergency lighting device in its switched-off state has no contrast to its environment, and in the switched-on state of the emergency lighting device, the light emitted emerges from the cabin component.

3 Claims, 2 Drawing Sheets

INVISIBLE EMERGENCY ILLUMINATION FOR AN AIRCRAFT CABIN

TECHNICAL FIELD

The invention relates to an emergency cabin illumination for an aircraft, such that when it is switched off, a passenger in the aircraft cannot recognize it as emergency illumination.

BACKGROUND OF THE INVENTION

Emergency illumination for a cabin of an aircraft is mandatorily prescribed, to illuminate the cabin in an emergency, e.g. to clear the cabin rapidly. It must be possible to operate the emergency illumination independently of other illumination equipment.

In cabins of the prior art, autonomous, separately installed and/or developed emergency illumination devices are used. These emergency illumination devices are, for instance, arranged on the overhead bins of a cabin. The emergency illumination devices are distributed through the cabin, visible to a passenger, and contribute to an uneasy appearance of the cabin as seen by the passenger. The inventors have also recognized that for sensitive passengers, an emergency illumination device has a psychological effect which should not be underestimated, since it confronts passengers with the possibility of an accident.

U.S. Pat. No. 6,095,662 discloses a light arrangement with an emergency illumination device with a first and second lamp and a transparent cover.

DE 298 09 772 U1 discloses a container unit for a lecture or presentation room. The arrangement of seats in the container unit generally corresponds to that of aircraft seats in an aircraft. In the middle of the ceiling, there is a continuous ventilation duct. In a stainless steel ventilation grille of the ventilation channel, additional radiators for direct lighting are fitted.

DE 82 20 984 U1 teaches a plurality of illuminated plates and plates between them which can act as emergency lighting.

EP 0 261 811 A2 describes escape route markers which are arranged in the floor of an aircraft.

WO 2005/094378 A2 describes a plurality of combinations of LEDs and reflectors, which can also be used as emergency lighting means.

It is an object of the invention to create emergency illumination which is not recognized as such by a passenger.

SUMMARY OF THE INVENTION

An emergency illumination for an aircraft comprises at least one cabin component of an aircraft and at least one emergency lighting device. The at least one emergency lighting device is arranged in or on the cabin component so that the emergency lighting device in its switched-off state has no contrast to its surroundings and/or the cabin component, and in the switched-on state of the emergency lighting device the light which it emits emerges from or on the cabin component. Because the emergency lighting device has no contrast to its surroundings and/or the cabin component, it cannot be detected by a passenger. Consequently, the emergency lighting device in its switched-off state is invisible to the passenger. It is understood that the term "cabin component" here does not per se mean a known structure for illuminating a cabin in an emergency, but includes a structure which can also be arranged in the cabin for another purpose. The term "no contrast" must be understood as meaning that within the wavelength range which is visible to the human eye, and the resolution capability of the human eye, no contrast results. Also, this term must be understood from the point of view of an aircraft passenger.

The emergency lighting device can be arranged in a relatively dark place, such as between two components, so that for this reason it cannot be seen, i.e. it has no contrast.

In a cabin of an aircraft, at least one emergency illumination system with at least one emergency lighting device can be arranged. In the switched-on state, the at least one emergency illumination system generates a brightness of at least the value which the applicable safety regulations prescribe, in particular about 0.54 lux, preferably about 1 lux or more, at the height of an arm rest in a gangway of an aircraft.

The emergency lighting device can be an LED. LEDs have a relatively high light output with small size, low heat output and a low power consumption relative to the light output, compared with incandescent lamps or halogen lamps. The emergency lighting device can include at least one associated functional element, for instance a reflector, a light outlet or a fixing component.

The at least one emergency lighting device, in its switched-off state in a cabin which is illuminated for normal operation, has no contrast to its surroundings and/or the cabin component. In normal operation, the cabin of an aircraft is illuminated such that in the gangway of the aircraft, at the height of an arm rest, the resulting brightness is about 100 lux.

It is thus understood that the emergency lighting device, in its switched-off state, has no contrast to its surroundings and/or the cabin component, even if the cabin is illuminated as is normal for a flight with passengers. The cabin component can be a cabin illumination, such as a reading lamp. Arranging the emergency lighting device in a cabin illumination system is preferred, since a light outlet, e.g. diffusers, is already present in it.

However, the cabin component can also be part of a ventilation component, which feeds air into the cabin or away from it. The emergency lighting device can, for instance, be arranged between the slats or fins of an air outlet or air inlet grille of such a ventilation component.

The cabin component can be spaced such a distance from another cabin component that between the cabin components there is an intermediate space, in which the emergency lighting device is arranged. Between individual components of a cabin, e.g. overhead bins, there are typically intermediate spaces which can receive the emergency lighting device.

The at least one emergency lighting device can also be arranged between elements of a cabin component, e.g. ceiling cladding or similar.

The emergency cabin illumination can comprise a plurality of emergency lighting device, which are arranged on one emergency illumination unit, the emergency illumination unit being arranged on and/or between at least two cabin components, such as ceiling cladding elements or overhead bins, in such a way that the light of the emergency lighting device can enter the cabin between the ceiling cladding elements or overhead bins. The plurality of emergency lighting device results in specially homogeneous lighting. The plurality of emergency lighting device also provides redundancy.

The emergency lighting unit can comprise a plurality of light outlets, from which the light of the emergency lighting device can enter the cabin. It is thus possible to hide the emergency lighting device in their switched-off state specially well from passengers.

The emergency cabin lighting can have multiple emergency lighting device, which are supplied redundantly with current. For instance, two current sources can be present, each of them supplying current to a set with at least one emergency lighting device. However, providing more than two current sources, each of them supplying current to a set with at least one emergency lighting device, is also conceivable.

Each redundant set of power supply and at least one emergency lighting device can generate a brightness of the prescribed minimum value, in particular about 0.54 lux at the height of the arm rest of an aircraft seat. Even if one set of power supply and at least one emergency lighting device fails, the prescribed minimum brightness is still present in an emergency. If, for instance, two redundant sets of power supply and at least one emergency lighting device are present, in an emergency double the value of the prescribed minimum brightness can be present in the cabin. If one redundant set of power supply and at least one emergency lighting device fails, the prescribed minimum brightness is still present.

The emergency lighting device can preferably radiate down from above. This has the effect that a passenger looking in the natural direction is not dazzled by the emergency lighting device. Further, the emergency lighting device per se also remains invisible to a passenger, provided that the passenger does not look upward.

By using multiple emergency lighting device, homogeneous lighting of the cabin can be achieved.

The invention also concerns a method of producing emergency illumination for an aircraft, with the step of arranging an emergency lighting device in or on a cabin component of the aircraft so that the emergency lighting device in its switched-off state has no contrast to its environment and/or the cabin components, and in the switched-on state of the emergency lighting device the light which it emits emerges from or on the cabin component.

BRIEF DESCRIPTION OF THE DRAWINGS

The invention is now described in more detail with reference to the attached schematic drawings, in which.

DETAILED DESCRIPTION

Figure 1:
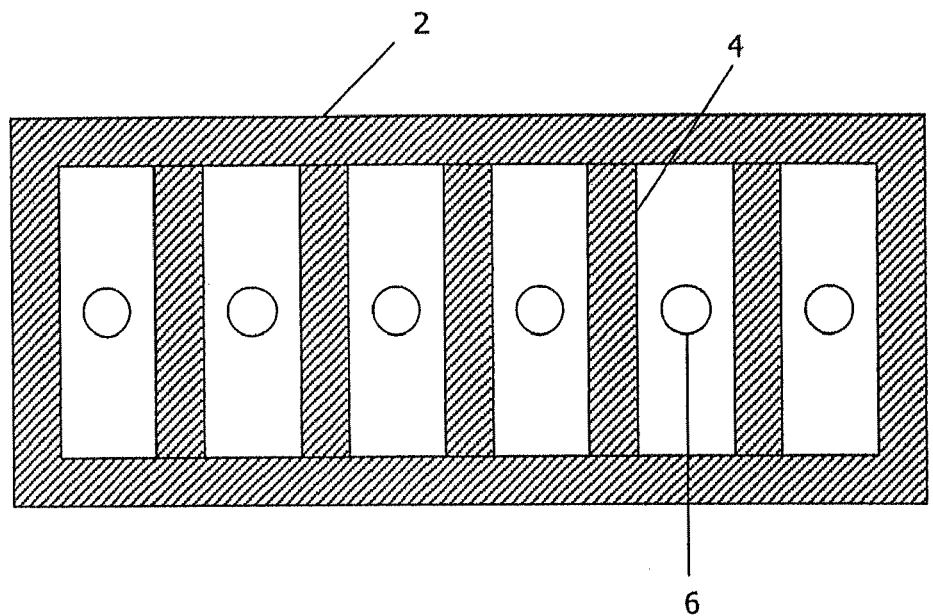
FIG. 1 is a not to scale view of an emergency illumination system, in which emergency lighting device are arranged in a ventilation component.

FIG. 1 shows schematically a ventilation component 2 with multiple fins and/or slats 4, with which air is fed into or out of a cabin of an aircraft. Between the fins and/or slats 4, and shifted back from the air outlet openings and air inlet openings of the ventilation component, a plurality of emergency lighting device 6, each in the form of an LED, are arranged. It is understood that the internal space of a ventilation component, compared with the cabin to be ventilated, is darker, since the cabin is illuminated in use, whereas the internal space of the ventilation component is not illuminated, and furthermore the fins and/or slats 4 shade the light of the cabin illumination. Because the internal space of the ventilation component 2 is dark, the emergency lighting device 6 in it cannot be detected, since they have no contrast to their environment.

In normal operation, the emergency lighting device 6 also have no contrast to the ventilation component 2 and the fins and/or slats 4, i.e. they are invisible to a passenger.

In emergency, the emergency lighting device 6 are activated via an autonomous power supply (not shown), so that they emit light, which enters the cabin through the intermediate spaces between the fins and/or slats 4 of a ventilation component 2. The emergency lighting device 6 only become detectable by a passenger in this rare case.

Figure 2:
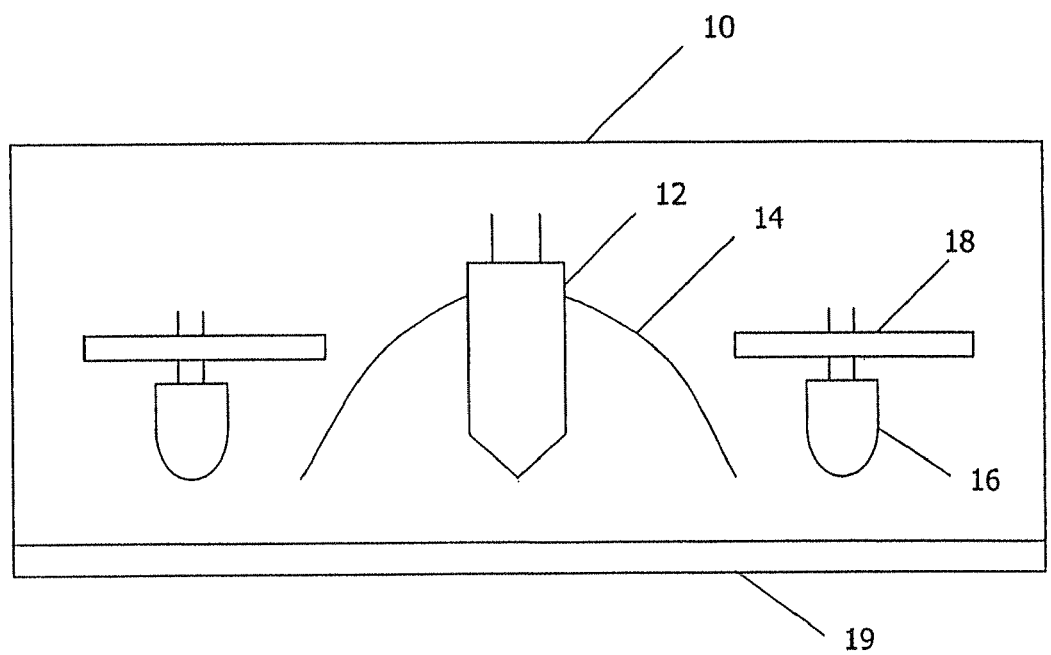
FIG. 2 is a not to scale view of a first emergency illumination system according to the invention, in which the emergency lighting device are arranged in a cabin illumination.

FIG. 2 shows an emergency lighting device 16, which is arranged in a cabin illumination 10. The cabin illumination device 10 includes a first lighting device 12, which can be a fluorescent tube, incandescent lamp or halogen lamp, a reflector 14 and a diffuser disc formed as a light outlet 19. In the cabin illumination 10, a plurality of emergency lighting device 16 in the form of LEDs are arranged on a supporting board 18. The emergency lighting device 16 is independently and autonomously supplied with current by the first lighting 12. Because of the diffuser disc 19, a passenger cannot detect the elements in a cabin lighting illumination 10, whereby the emergency lighting device 16 have no contrast to the other elements of the cabin illumination and the cabin illumination 10 as a whole, and are thus invisible to a passenger. Even if the light outlet 19 is not formed as a diffuser disc, a passenger cannot detect the switched-off emergency lighting device 16 if the first lighting device 12 is switched on, because the first lighting device 12 has such brightness that the passenger by looking directly into the cabin lighting 10 is dazzled, so that the switched-off emergency lighting device 16 has no contrast to the cabin illumination 10 or the elements of the cabin illumination 10.

If the emergency lighting device 16 are switched on by switching on the autonomous emergency power supply, they emit light which enters the cabin via the light outlet 19. A passenger detects that the emergency lighting device 16 are present only in this rare case.

The cabin illumination can be a reading lamp or a radiator, which is arranged on the ceiling of the aircraft. Multiple emergency lighting device can be provided. Multiple redundant sets of emergency power supply and at least one emergency lighting device can be present. In this way, the safety of the emergency lighting is increased.

In this embodiment, the emergency lighting device is disguised in a "cabin illumination", so that in normal operation it is invisible to a passenger. The expression "normal operation" device that no emergency exists.

Figure 3:
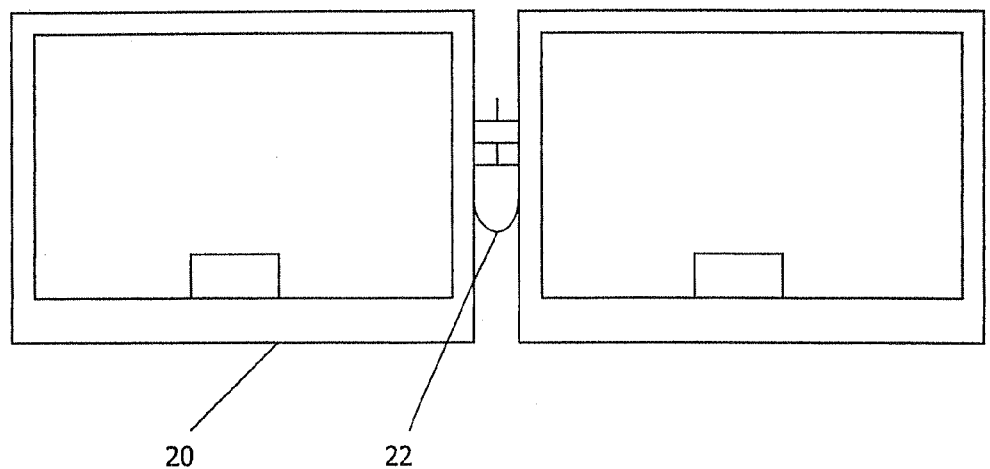
FIG. 3 is a not to scale view of a second embodiment of the invention, which an emergency lighting device is arranged in a cabin component.

FIG. 3 shows, schematically and not to scale, two overhead bins 20, which are arranged in the upper region of the cabin. Between the overhead bins, according to the invention an emergency lighting device 22, which can be in the form of an LED, is arranged. The emergency lighting device 22 is in an intermediate space between the two overhead bins. Because the intermediate space between the overhead bins is not illuminated, the emergency lighting device 22 has no contrast to its surroundings, i.e. to the intermediate space between the overhead bins 20 and the overhead bins 20 as such. At the lateral end of the intermediate space, a screen can be arranged, so that the intermediate space is undetectable for a passenger if he looks laterally in the direction of the overhead bins 20. If the emergency lighting device 22 is in the form of an LED, only a very small intermediate space between the overhead bins 20 is required, so that a passenger is not aware of the intermediate space. At the lower end of the intermediate space, between the overhead bins 20, a diffuser can also be arranged, so that a passenger is not aware of the intermediate space between the overhead bins 20.

If the emergency lighting device 22 is supplied with current via an autonomous power supply, the light which the emergency lighting device 22 emits emerges from the intermediate space between the overhead bins 20 and illuminates the cabin. A passenger of the aircraft detects that the emergency lighting device 22 are present only in this rare ease.

Figure 4:
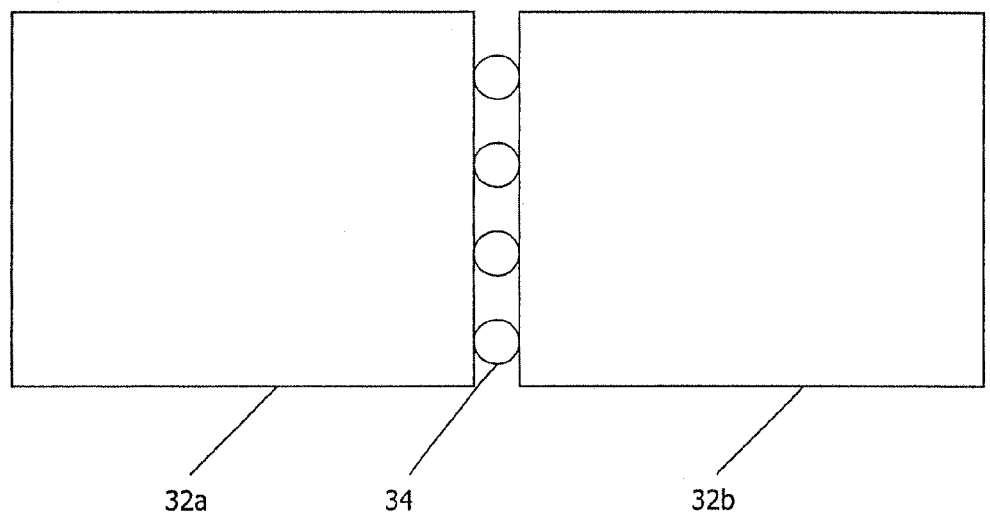
FIG. 4 is a not to scale view of a third embodiment of the invention, in which a plurality of emergency lighting device are arranged between elements of ceiling cladding.
Figure 4:
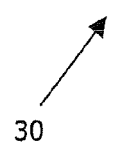

FIG. 4 shows a plurality of emergency lighting device 34, which according to the invention are arranged between two ceiling cladding elements 32a, 32b of ceiling cladding 30. Because the intermediate space between the ceiling cladding elements 32a, 32b is not lit, the emergency lighting device 34 have no contrast to their environment, i.e. to the intermediate space between the ceiling cladding elements 32a, 32b and the ceiling cladding elements 32a, 32b as such.

The present invention thus provides emergency cabin illumination with at least one emergency lighting device, which in its switched-off state has no contrast to its surroundings. The surroundings of the emergency lighting device can be a cabin component or a space on a cabin component. For the purpose of the invention, a plurality of elements in a cabin can also be considered as one cabin component. For instance, the emergency lighting device can be arranged in ceiling cladding, which represents a cabin component and consists of multiple elements.

Because the emergency lighting device in its switched-off state has no contrast to its surroundings, the emergency lighting device is not detected by a passenger in the cabin of the aircraft. Consequently, the passenger is not unnecessarily confronted with the possibility of an accident or emergency, so that the passenger feels safer in the aircraft. In an emergency, the light which the emergency lighting device emits emerges from or on the cabin component, and thus illuminates the cabin so that a passenger can leave the cabin safely in an emergency.

The invention claimed is:

1. Emergency cabin illumination for an aircraft, comprising:
    at least one emergency lighting device, and
    a diffuser,
    wherein the emergency lighting device is arranged so as to be recessed within a vertically-oriented gap between a first overhead bin and a second overhead bin adjacent to the first overhead bin, the vertically-oriented gap dividing a storage space within the first overhead bin from a storage space within the second overhead bin, wherein said gap is not illuminated during normal operation of the aircraft such that the emergency lighting device has no contrast to its surroundings and is hidden from view within said gap, and wherein in the switched-on state of the emergency lighting device, the light emitted therefrom emerges from the gap between the first and second overhead bins,
    wherein the first overhead bin and the second overhead bin are disposed in a same individual row of overhead bins running along a longitudinal direction of the aircraft,
    wherein the vertically-oriented gap is oriented transverse to the longitudinal direction of the individual row of overhead bins and the vertically-oriented gap separates the first overhead bin from the second overhead bin, and
    wherein the diffuser is mounted flush with a lower end of the vertically-oriented gap between the first and second overhead bins.

2. Emergency cabin illumination according to claim 1, wherein the emergency lighting device comprises an LED.

3. Emergency cabin illumination according to claim 1, wherein the emergency cabin illumination generates a brightness of at least 0.54 lux at the height of the arm rest of an aircraft seat.

* * * * *